United States Patent [19]

Komine et al.

[11] 3,963,331

[45] June 15, 1976

[54] CAMERA CAPABLE OF SIMULTANEOUS SOUND RECORDING

[75] Inventors: Yoshio Komine, Tokyo; Kazuya Hosoe, Machida; Mamoru Shimazaki; Toshikazu Ichiyanagi, both of Tokyo; Kiyoshi Takahashi, Kunitachi, all of Japan

[73] Assignee: Canon Kabushiki Kaisha, Tokyo, Japan

[22] Filed: Oct. 2, 1974

[21] Appl. No.: 511,207

[30] Foreign Application Priority Data
Oct. 5, 1973  Japan............................ 48-112635

[52] U.S. Cl.................... 352/29; 352/26; 352/27; 352/30; 352/72; 352/78 R
[51] Int. Cl.²........................................ G03B 19/18
[58] Field of Search ............... 352/26, 27, 29, 30, 352/72, 78 R; 350/266, 268

[56] References Cited
UNITED STATES PATENTS

| | | | |
|---|---|---|---|
| 3,405,945 | 10/1968 | Braeth | 352/29 |
| 3,825,327 | 7/1974 | Kosarko et al | 352/72 |
| 3,880,504 | 4/1975 | Marvin | 352/30 |

*Primary Examiner*—L. T. Hix
*Assistant Examiner*—Russell E. Adams, Jr.
*Attorney, Agent, or Firm*—Toren, McGeady and Stanger

[57] ABSTRACT

The present invention relates to a camera capable of simultaneous film and sound recording and into which film magazine housing a film with a sound recording belt can be loaded. The camera has a sound recording device for recording sound on said sound recording belt of the film while photographing is made and also a driving device to continuously run the above mentioned film against said sound recording device. The camera can be shifted to the simultaneous sound recording state in response to the shutter release operation of the camera being in the preparation completion state for photographing with simultaneous sound recording. The camera is characterized in that a biasing device to bias at least one of the above mentioned driving devices and the film to a film driving position and a retention device which can retain the relative position of the above mentioned driving device and the film at a preparatory position for the above mentioned film driving position against the biasing force of said biasing device and can be released are provided. The release of the retention force of said retention device is done in response to the shutter release of the camera.

4 Claims, 4 Drawing Figures

CAMERA CAPABLE OF SIMULTANEOUS SOUND RECORDING

BACKGROUND OF THE INVENTION

1. Field of the Invention

The present invention relates to a camera to which a film magazine housing a film with sound recording belt can be loaded and in which photographing is done while sound is recorded in said sound recording belt.

2. Description of the Prior Art

Recently it has become common in the field of a motion picture camera using an 8 mm film to use a film of magazine-housed type which is easily loaded into a camera. Lately a film magazine has appeared which has a sound recording belt and is able to be easily loaded into a simultaneous sound recording camera in which photographing and sound recording can be done simultaneously. Said film magazine has such an arrangement that a sound recording opening is provided beside a conventional picture image recording opening in said film magazine, and a constant speed feeding of the film for sound recording is done and sound recording is done by a magnetic head on the sound recording belt which is formed by magnetic coating on the film. While such elements for sound recording as a film feeding capstan, a pinch roller, a magnetic head, a head pad, a film guide, etc. are placed at such position as corresponds to the sound recording opening of the magazine in the film chamber in such motion picture camera using said simultaneous sound recording film magazine, these elements need such structure that when the film magazine is loaded into a camera or unloaded therefrom, the capstan and the pinch roller are separated from each other and so are the magnetic head and head pad to make the insertion of film therebetween easy. Also while the camera is in operation after the film magazine is loaded, the capstan and the pinch roller come into pressure contact to advance the film, which is being pressure held thereby, with a constant speed. At the same time, the magnetic head and the head pad come in pressure contact with the film being held therebetween so that sound recording is done magnetically at the sound recording belt of the film. To this end, such structure is generally used that the capstan and the magnetic head are used as the sound recording means fixed at the film chamber and, at the same time, the pinch roller, the head pad, and film guide, etc. are made as movable means. Such movable means are made to pressure contact with or separate from the above mentioned sound recording means in association with the operation of loading of the film magazine into the camera and unloading of the same from the camera.

Further, such structure is required that out of said movable members, the pinch roller maintains such state so as to leave a slight gap between the capstan and itself even when the other parts, i.e., head pad etc. are pressure contacted with the above mentioned sound recording unit part, and is pressure contacted with the capstan in association with the release action for photographing in a camera, and is separated slightly from the capstan again at the same time the release is stopped. A first reason therefor is that since the capstan ordinarily has a fly wheel for facilitating the rotation, it keeps on rotating by inertia after the shutter release is stopped. Therefore unless the pinch roller is separated from the capstan at the same time as the release is stopped, the film is fed excessively. A second reason therefor is that since the kind of material of the pinch roller ordinarily resembles rubber, when it remains in pressure contact with the capstan for a long time it is deformed, which is apt to cause wow and flutter at the time of later reproduction, therefore it needs to be prevented.

The engagement and disengagement of the pinch roller with the capstan in association with the shutter release has been done conventionally by such set-up that a spring member is made to intervene between a shutter release linked member and a movable member having the above mentioned pinch roller. The spring member is made to be compressed or expanded by the shutter release operation, and the pinch roller is made to pressure contact with the capstan by said spring power. To this end, while the release operation of the camera is desired to be as light as possible as its very nature, in the simultaneous sound recording camera with the above mentioned set-up, heavier a release operation has to be used unavoidably compared to that in a camera for picture image recording only without sound recording.

SUMMARY OF THE INVENTION

The first object of the present invention is to provide a camera capable of simultaneous sound recording with light shutter release operation.

The second object of the present invention is to provide a camera capable of simultaneous sound recording, disclosing a concrete means to start the recording action of a sound recording means in association with the starting of film running in response to shutter release operation.

The third object of the present invention is to provide a camera capable of simultaneous sound recording, disclosing a concrete means to achieve the preparation complete state for photographing with simultaneous sound recording by closing operation of the film magazine chamber opening and closing cover.

Further, other objects of the present invention shall become apparent by the following description and the drawings.

DESCRIPTION OF THE PREFERRED EMBODIMENTS

Figure 1:
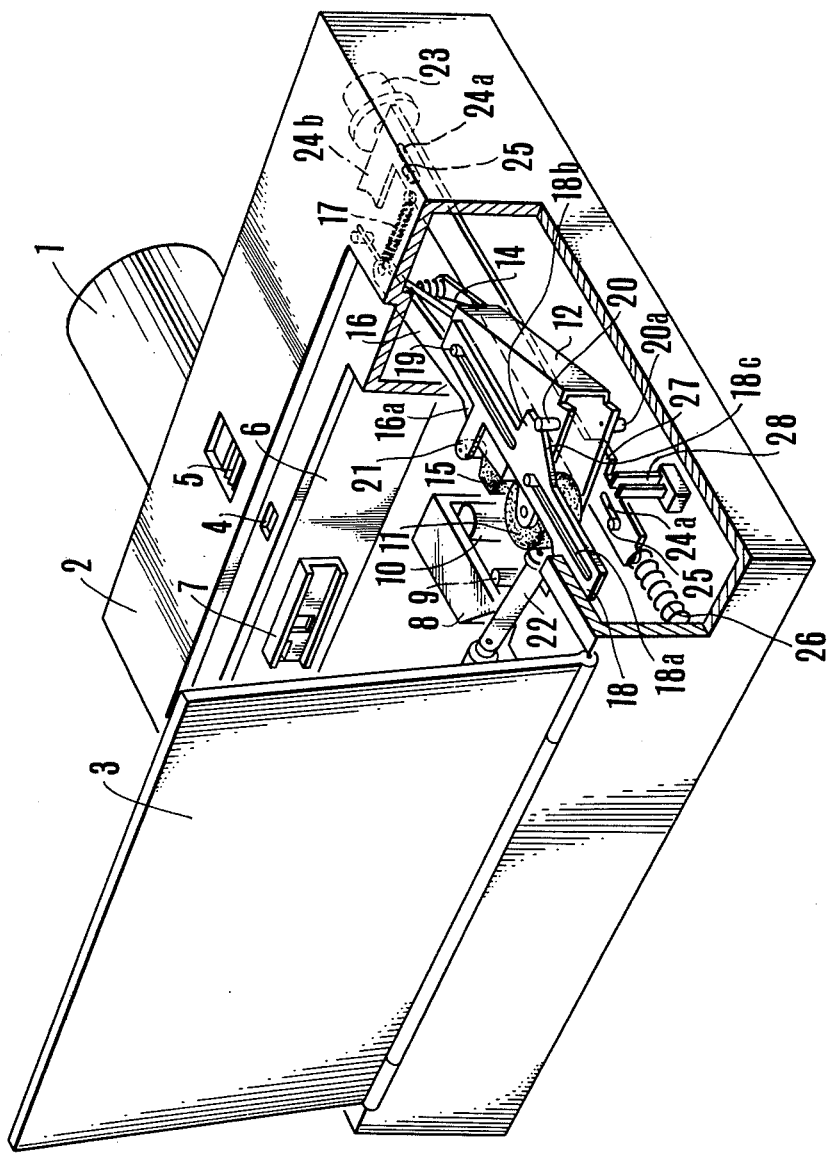
FIG. 1 is an oblique view of one example of the camera capable of simultaneous sound recording according to the present invention, wherein the camera is partially broken to show important parts in detail.

Now an example of the camera according to the present invention will be explained in detail referring to the drawings.

FIG. 1 is an oblique view of a camera capable of simultaneous sound recording showing the set-up of important parts when the camera according to the present invention is applied to a cine-camera, wherein a portion of external case is sectioned for the purpose of explanation. In the drawing, 1 is a photographing lens. 2 is a camera main body. 3 is a film magazine chamber cover. 4 is a locking part to fix said magazine chamber cover when it is closed. 5 is its opening and closing knob. 6 is a magazine chamber into which a film magazine allowing simultaneous sound recording is loaded. 7 is a film gate for photographing. 8 is a sound recording unit part, housing a capstan 9 being rotatingly driven by a driving means not shown in the drawing through a fly wheel and a sound recording head 10. 11 is a pinch roller supported in a manner being able to be pressure contacted with said capstan and is rotatably attached to a movable member 12. 13 is an axle of said movable member 12. 14 is a spring always biasing the movable member 12 to such direction that the pinch roller 11 is pressure contacted to the capstan 9. 15 is a head pad which can be pressure contacted to the sound recording head and is attached to a movable plate 16 being co-axial with the above mentioned axle 13, being always biased to such direction that the head pad is pressure contacted with the above mentioned sound recording head 10 by a spring 17. 18 is a sliding plate being slidable to the direction of a long groove 18a engaged with two fixed axles 19 being planted on the camera main body. 20 is a pin planted on the above mentioned movable plate 12, and a projection 18b having a tapered part 18c of the sliding plate 18 engages with or disengages from said pin 20. 21 is a pin being downwardly planted on a part of said sliding plate 18 and is in an engage or disengage relationship with the tapered part 16a of the above mentioned sliding plate 16. 22 is an arm connecting the sliding plate 18 and the magazine chamber cover 3 and is so made as to have the sliding plate 18 slide in association with the opening and closing action of the magazine chamber cover.

23 is a shutter release button. 24 is a release sliding plate integrally functioning with said release button and can slide along the direction of a long groove 24a which engages with two fixed axles 25 being guided by said groove, and is always biased to such direction by a compressive spring 26 that the release button 23 protrudes to the front plane of the camera. 24b is a part connected to a conventionally known stopper and an electric switch which is not shown in the drawing but performs the initiation and stoppage of film advancement driving. 20a is a pin planted on the above mentioned movable member 12 at its opposite side to the pin 20. 27 is a projection part having a tapered part being provided on a part of the above mentioned release sliding plate 24, and is in an engage or disengage relationship with the above mentioned pin 20a. 28 is a switch for a conventionally known sound recording circuit or for a capstan driving circuit for sound recording. Said switch 28 may be commonly used both for the sound recording circuit and the driving circuit and is opened and closed by a projection 27 as the shutter release button 23 is pushed.

Figure 2:
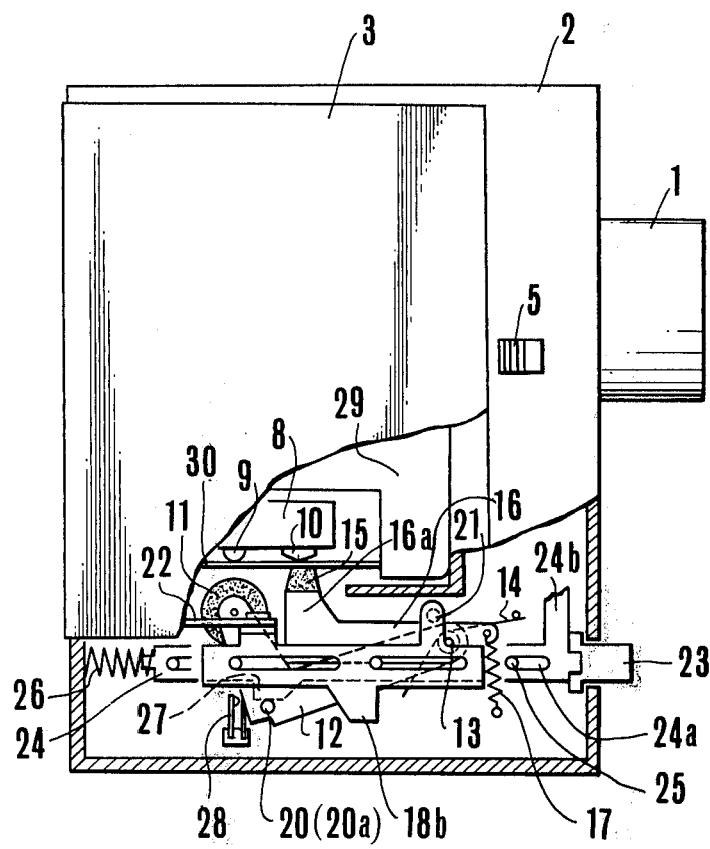
FIG. 2 is a front elevation of the camera shown in FIG. 1 in a preparatory state for sound recording.

FIG. 2 shows a camera in a state wherein the film magazine for simultaneous sound recording is loaded and the magazine chamber cover is closed and a portion thereof is sectioned. In the drawing, 29 is a simultaneous sound recording magazine and 30 is a film having a sound recording belt.

Figure 3:
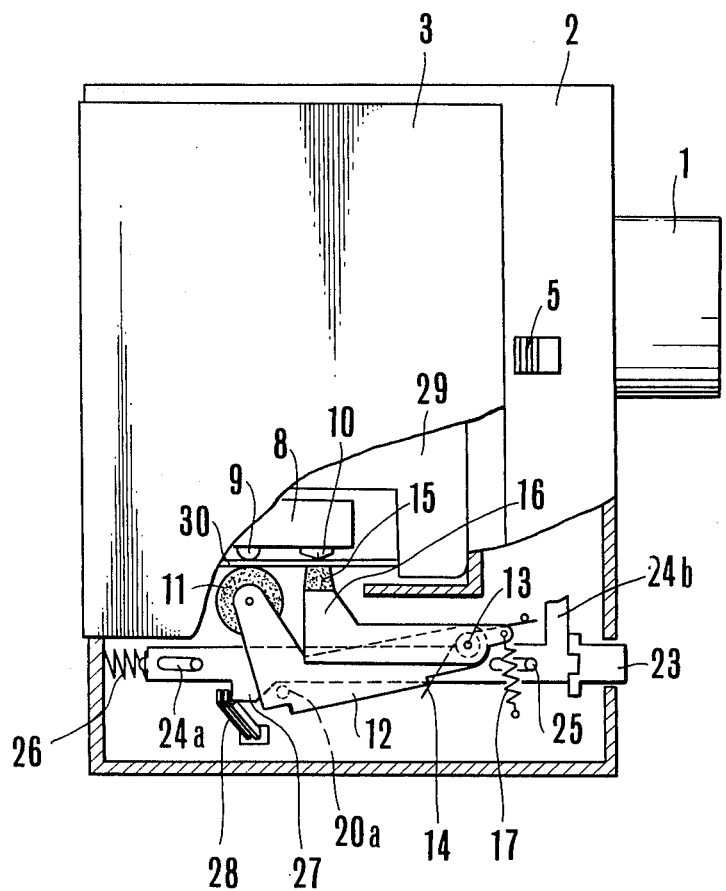
FIG. 3 is a front elevation of the same in a state in which it is shifted from the state of FIG. 2 to the simultaneous sound recording photographing state.

FIG. 3 shows the camera shown in FIG. 2 in such state as pushing the shutter release button from the state of FIG. 2, and the parts concerning the sliding plate 18 which is in a same state as in FIG. 2 is omitted for easy understanding.

The function and effect of the present invention will be now explained in detail using FIG. 1 to FIG. 3.

Now, in the state shown in FIG. 1 wherein the film magazine chamber cover is opened, the sliding plate 18 is at its slided-to-rear position by the connecting arm 22 being coupled with the film magazine chamber cover.

By this, the projection part 18b of the sliding plate 18 engages with the pin 20 on the movable plate 12, thereby said movable plate 12 is rotated in a counterclockwise direction and the pinch roller 11 is shifted to and retained in the state which is separated from the capstan 9. Also since the pin 21 planted on a part of the sliding plate 18 is riding onto the tapered part 16a of the movable plate 16 and is in a state to rotate said movable plate 16 in a counterclockwise direction, the head pad 15 is in a state being separated from the sound recording head 10. As there is a gap between the sound recording unit part 8 and the pinch roller 11, the head pad 15 in this state, the simultaneous sound recording film magazine 29 can be easily loaded into the magazine chamber 6, and the film within said magazine will be positioned between the sound recording unit part 8 and the pinch roller, head pad, etc.

Next as the magazine chamber cover is closed from said state wherein the magazine is loaded, the connecting arm 22 shifts the sliding plate 18 to right hand direction in FIG. 3, thus the state of FIG. 2 is obtained. By this the pin 21 on the sliding plate 18 is separated from the tapered part 16a of the movable plate 16, therefore the movable plate 16 is rotated in a clockwise direction having the head pin 15 pressure contacted to the sound recording head 10 with the film 30 being sandwiched therebetween. Also as the pin 20 on the movable member 12 becomes free as it is separated from the projection part 18b of the sliding plate 18, the movable member 12 is rotated in a counterclockwise direction by the spring 14, but as its rotation is blocked when the pin 20a at the reverse side of said movable member 12 comes in contact with the projection part 27 on the release slide plate 24, the pinch roller 11 is retained at a preparatory position for sound recording being separated slightly from the film.

Next in FIG. 3 in the sate wherein the release button for photographing is pushed, as the release slide plate 24 slides in the left hand direction in the drawing, the projection part 27 is separated from the pin 20a at the lower side of the movable member 12. Therefore said movable member 12 is allowed to rotate by the force of the spring 14, thereby the pinch roller 11 comes in pressure contact with the capstan 9 with film 30 being sandwiched therebetween. At this time the projection 27 of the release sliding plate 24 closes the switch 28 of the conventionally known capstan driving circuit.

Figure 4:
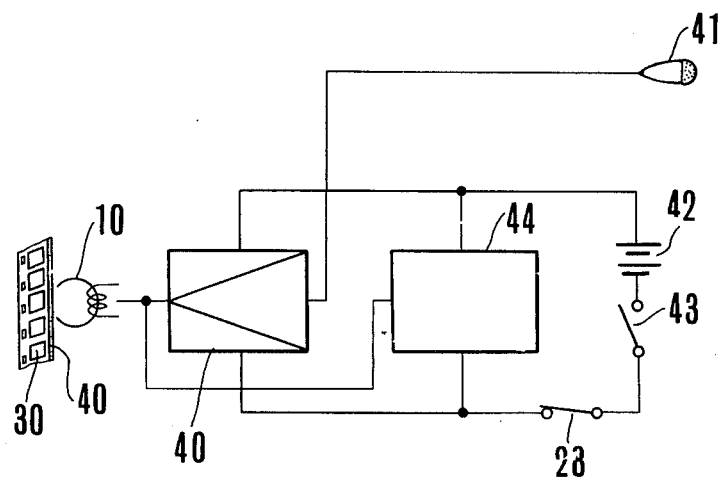
FIG. 4 is an example of connection diagram of a sound recording circuit which can be applied to the camera capable of simultaneous sound recording according to the present invention.

FIG. 4 shows an example of a sound recording circuit which can be applied to a camera capable of simultaneous sound recording according to the present invention, and the film 30, the sound recording belt 40 on said film, and the sound recording head 10 for recording sound signal on said recording belt are the same as those previously mentioned. The above mentioned switch 28 to stop the recording function of the sound recording means shown in FIG. 1 to FIG. 3 is connected to a power source 42 through a main switch 43.

The above mentioned sound recording head 10 is connected to an amplification circuit 40, and said amplification circuit 40 is connected to a sound pick-up microphone 41 which can be attached to and detached from the camera shown in FIG. 1 to FIG. 3 and is further connected to a power source. Also the above mentioned sound recording head 10 is connected to a conventionally known bias oscillator 44.

The sound recording circuit itself with such set-up as mentioned above is satisfied with a conventionally known circuit and its function is easily understood by those familiar with the industry, therefore the explanation therefor is omitted.

The sound signal picked up by the sound pick-up microphone and converted into electric signal is, after being amplified by the amplification circuit, recorded at the sound recording belt 40 of the film 30 by the sound recording head 10 together with the biassing signal.

While the above mentioned switch 28 may be of such set-up as making the sound recording function of such sound recording circuit as mentioned above unserviceable, on the other hand it may be of such set-up as making unserviceable the driving function of the driving circuit of the conventionally known capstan 11, constituting the coupling and feeding means for sound recording shown in FIG. 1 to FIG. 4, thus making the sound recording function inactive. Therefore, the capstan 9 starts functioning at the same time when the film advancing driving circuit not shown in the drawing starts operation, and the film starts moving by said capstan and the pinch roller 11, thus photographing with simultaneous sound recording is done. Also when photographing is stopped, the release sliding plate 24 returns to its original position by the force of the compressive spring 26 by releasing finger from the release button 23. At this time the pin 26 rides onto the tapered part of the projection 27 on said release sliding plate 24 and the movable member 12 is rotated in a counterclockwise direction, while the pinch roller returns automatically to the state of FIG. 2 being separated from the film.

As has been explained above, since the present invention has such set-up that the pinch roller is allowed to be pressure contacted with the capstan by removing the retention power of the retention member which prevents the movable member having the pinch roller which is biased toward the capstan by the spring biasing in such a direction as making sound recording, in the operating direction of said movable member, and said removal of retention force is done by the release operation, the pressure contacting force of the pinch roller to the capstan will not work on the release button at all during photographing. Thus, the arrangement has very excellent effect that a photographer can make photographing with simultaneous sound recording by light a release operation.

What is claimed is:

1. A motion picture camera capable of recording the image and sound information simultaneously on a photographic film for which a film magazine housing a sound recording band is provided, comprising:
   a camera housing having a magazine housing chamber provided with one aperture allowing the loading and unloading of the film magazine;
   an opening and closing cover for selectively covering said aperture of said magazine housing chamber;
   film driving means;
   a release control means for selectively controlling the starting and stopping of said driving means, said release control means being controllable from outside said housing;
   an image-forming means for forming image information on said photographic film;
   a sound recording means, said means having the following elements disposed on the opposite sides of a film passage with said film pinched therebetween:
      a transducing head means capable of recording said sound information on said magnetic recording band incorporated in said film;
      a head pad member for contacting with pressure said transducing head means with said film so as to allow an optimum condition, said head pad member being selectively shiftable between a first position in which it functionally is brought into pressurized contact with said transducing head means, a second position in which it keeps a slight gap with regard to said transducing head means and a third position in which said gap between two members becomes wide enough to simplify exchanging the loading and unloading of the film;
   a first film transport means for feeding film to the picture image forming position of said picture image forming means;
   a second film transport means for said film continuously feeding at least between said transducing head means and said head pad member, said second film transport means having the following elements located respectively at opposite sides pinching said passage of the film therebetween: a capstan, a rotatable pinch roller, said pinch roller being shiftable between a first position in which said pinch roller is functionally engaged with said capstan permitting thereby the feeding of said film, a second position in which a slight gap is set up so as to make impossible the transport of the film, and a third position in which the pinch roller is widely separated from said capstan so that the loading and unloading of the film magazine may be performed, while the feeding of the film is made impossible;
   a shift means control for controlling the shifting motion of said head pad member and said pinch roller, said means being selectively shifted between a first position for holding said head pad member and said pinch roller together in said first position, a second position in which said head pad member and said pinch roller are held in said second position and a third position in which said head pad member and said pinch roller are held at said third position;
   a first energizing means, for energizing said shift control means which is maintained directed toward said first position by axially directed spring pressure;
   a first energizing means for energizing said shift control means always in the direction of said first position;
   a first member shiftable from an allowing position in which said shift control means is allowed to shift from said third position to said second position, to an engaging position in which said shift control means is forcedly shifted from said second position to said third position against the energizing force of said first energizing means, said member being mechanically linked to a part of said open-and-close cover so that when said open-and-close cover is closed, said member is forcedly shifted from said engaging position to said allowing position, directly subjected to a closing pressure necessary for the closing operation applied to said open-and-closed cover, and when said open-and-close cover is opened, said member is forcedly shifted from said first position to said second position, directly subjected to an opening pressure necessary for the opening operation applied to said open-and-close cover;

a second member capable of shifting toward a first position in which said shift control means is allowed to shift said second position and a second position in which said shift control means is forcedly shifted from said first position to said second position against the energizing force of said first energizing means, said member being mechanically linked with said release control means, so that said member is shifted to said first position in association with the action of said release control means, and shifted to said second position in relation with the stopping of the operation; and an energizing member for energizing said second member so as to be energized for being shifted in such a manner that said member is always capable of being shifted toward said second position, the energizing force of said energizing member being greater than that of said energizing means of said first means.

2. A camera according to claim 1, in which said sound recording means and said transducing head means have recording circuits connected electrically therewith and a switch means which serves to selectively nullify said recording circuit, said switch means being located in the movable domain of said second member material and when said second member material is set in said first position, the pressing force yielded in said second member switches on said recording circuit, and when it is set in said second position said pressing force of said record member is eliminated, thereby resulting in the nullifying of said second circuit.

3. A camera according to claim 1, in which first member possesses a cam wherein said shift means is always kept in pressurized contact with said cam, and said second member also possesses a cam wherein said shift control means is always kept in pressurized contact with said cam.

4. A camera according to claim 3, in which said cams incorporated in said first and second member possess an inclined plane, said oblique surfaces being directed toward the second shift position coming from the first shift position respectively with regard to said first and second members.

* * * * *